US010155449B2

(12) United States Patent
Chen et al.

(10) Patent No.: US 10,155,449 B2
(45) Date of Patent: Dec. 18, 2018

(54) BATTERY POWER INTEGRATION APPARATUS AND HEV POWER SYSTEM HAVING THE SAME

(71) Applicant: DELTA ELECTRONICS, INC., Taoyuan County (TW)

(72) Inventors: Chin-Hou Chen, Taoyuan County (TW); Wen-Sheng Tsao, Taoyuan County (TW); Chen-Bin Huang, Taoyuan (TW); Jui-Teng Chan, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 507 days.

(21) Appl. No.: 14/947,149

(22) Filed: Nov. 20, 2015

(65) Prior Publication Data

US 2016/0229298 A1 Aug. 11, 2016

(30) Foreign Application Priority Data

Feb. 9, 2015 (CN) .......................... 2015 1 0067186

(51) Int. Cl.
*B60L 11/18* (2006.01)

(52) U.S. Cl.
CPC ........... *B60L 11/18* (2013.01); *Y02T 10/7005* (2013.01); *Y02T 10/7233* (2013.01)

(58) Field of Classification Search
CPC ..................................................... B60L 11/18
USPC ..................................................... 307/10.1
See application file for complete search history.

(56) References Cited

U.S. PATENT DOCUMENTS

| 5,796,175 | A | * | 8/1998 | Itoh | B60L 3/0023 |
| | | | | | 307/10.1 |
| 9,809,119 | B2 | * | 11/2017 | She | H02M 3/33584 |
| 9,937,805 | B2 | * | 4/2018 | Lee | B60L 11/1816 |
| 2009/0043476 | A1 | * | 2/2009 | Saito | B60W 10/26 |
| | | | | | 701/102 |
| 2009/0251103 | A1 | * | 10/2009 | Yamamoto | B60K 6/48 |
| | | | | | 320/133 |
| 2010/0276993 | A1 | * | 11/2010 | King | B60L 11/12 |
| | | | | | 307/9.1 |

(Continued)

FOREIGN PATENT DOCUMENTS

CN 203193499 9/2013

OTHER PUBLICATIONS

Office Action dated Sep. 18, 2017 from corresponding application No. CN 201510067186.7.

*Primary Examiner* — Adi Amrany
(74) *Attorney, Agent, or Firm* — Hauptman Ham, LLP

(57) ABSTRACT

A battery power integration apparatus includes a power converter, a battery control module, and a relay. The power converter has an input side and an output side, and the input side is connected to a high-voltage DC voltage. The battery control module includes a relay control circuit and a pre-charge control circuit. The relay is connected to the input side of the power converter and the battery control module. The pre-charge control circuit receives a pre-charge enable signal generated from the power converter to pre-charge the input side of the power converter. The power converter steps down the high-voltage DC voltage to output a low-voltage DC voltage at the output side thereof when the relay control circuit turns on the relay, thus supplying the required power for low-voltage devices inside a hybrid electric vehicle.

11 Claims, 5 Drawing Sheets

(56) References Cited

U.S. PATENT DOCUMENTS

| | | | |
|---|---|---|---|
| 2010/0277845 A1* | 11/2010 | Park | H02H 9/001 361/87 |
| 2012/0139338 A1* | 6/2012 | Kim | B60L 1/00 307/10.1 |
| 2013/0127400 A1* | 5/2013 | Oh | B60L 11/14 320/104 |
| 2014/0021800 A1* | 1/2014 | Kang | B60L 11/1805 307/115 |
| 2014/0021916 A1* | 1/2014 | Bilezikjian | B60L 3/0046 320/109 |
| 2014/0028087 A1* | 1/2014 | Lee | B60R 16/02 307/9.1 |
| 2014/0091619 A1* | 4/2014 | Yoshimi | B60L 3/0092 307/10.1 |
| 2014/0139150 A1* | 5/2014 | Morisaki | B60L 15/20 318/139 |
| 2015/0131350 A1* | 5/2015 | Isomura | H02M 1/38 363/131 |
| 2015/0231976 A1* | 8/2015 | Byun | B60L 11/185 320/109 |
| 2016/0031440 A1* | 2/2016 | Youn | B60W 20/50 701/22 |

* cited by examiner

BATTERY POWER INTEGRATION APPARATUS AND HEV POWER SYSTEM HAVING THE SAME

BACKGROUND OF THE INVENTION

1. Technical Field

The present disclosure relates generally to a battery power apparatus for a vehicle, and more particularly to a battery power integration apparatus and a HEV power system having the same.

2. Description of Related Art

Because of the environmental awareness today, the hybrid electric vehicle (HEV) with energy-saving and low-pollution advantages is increasingly popular. In addition, the HEV is a vehicle which combines advantages of large output power, good endurance, and low noise. Accordingly, the HEV is more competitive to become the mainstream vehicle in the future.

The HEV usually provides a vehicle power control system composed of a 48-volt high-voltage rechargeable battery, a 12-volt low-voltage battery, a DC-to-DC converter, and a battery management system (BMS). The DC-to-DC converter is used to provide the power conversion and the BMS is used to manage the high-voltage rechargeable battery. For the vehicle power control system, the DC-to-DC converter converts the 48-volt high-voltage DC power source into the 12-volt low-voltage DC power source to provide the required power for low-voltage devices or electronic devices inside the HEV. The high-voltage rechargeable battery is composed of a plurality of cells connected in series. The battery management system is used to manage the high-voltage rechargeable battery by detecting temperature and voltage conditions of the cells, and also charge and discharge the cells according to the detected temperature and voltage conditions, thus extending lifetime of the high-voltage rechargeable battery.

Reference is made to FIG. 1 which is a block circuit diagram of a related-art vehicle power conversion system. The vehicle power conversion system mainly includes an electricity generation apparatus 50a, a low-voltage device 60A, a low-voltage battery 40A, a power converter 20A, a fan 30A, and a high-voltage battery control management integration apparatus 10A. Especially, the high-voltage battery control management integration apparatus 10A mainly has a battery control module 101A, a high-voltage battery 102A, a battery management system 103A, and a relay 104A. In particular, the battery control module 101A has a relay control circuit 1011A, a pre-charge control circuit 1012A, and a fan control circuit 1013A.

In this existing system structure, as shown in FIG. 1, the relay control circuit 1011A, the pre-charge control circuit 1012A, and the fan control circuit 1013A are integrated with the battery management system 103A. Hence, an additional power source is needed for the battery control module 101A at the battery management system 103A, thus increasing the overall system costs.

In addition, the power converter 20A is only used to step down the voltage to charge the low-voltage battery 40A or supply power to the low-voltage device 60A in the existing vehicle power conversion system. Also, the power converter 20A is communicated with the battery management system 103A through communication interfaces. Hence, the relay 104A could be slowly tuned off when the abnormal fault occurs because of the limitation of communication delay, thus causing damages of the high-voltage battery 102A and the power converter 20A.

In addition, the on-off and pre-charge controls of the relay 104A and the control of the fan 30A are managed by the battery management system 103A, thus increasing the design complexity of the battery management system 103A.

Accordingly, it is desirable to provide a battery power integration apparatus and a HEV power system having the same to reduce the number of components, omit the SPI interfaces, simplify the design complexity, and reduce the overall system costs; and also immediately turn off the relay to rapidly execute protection operations and increase the power supply reliability when abnormal conditions of the system occur by integrating the battery control module and the power converter.

SUMMARY

An object of the present disclosure is to provide a battery power integration apparatus to solve the above-mentioned problems. The battery power integration apparatus applied to a hybrid electric vehicle (HEV). The battery power integration apparatus includes a power converter, a battery control module, and a relay. The power converter has an input side and an output side, and the input side is connected to a high-voltage DC voltage. The battery control module includes a relay control circuit and a pre-charge control circuit. The relay is connected to the input side of the power converter and the battery control module. The pre-charge control circuit receives a pre-charge enable signal generated from the power converter to pre-charge the input side of the power converter. When the relay control circuit turns on the relay, the power converter steps down the high-voltage DC voltage to output a low-voltage DC voltage at the output side, thus supplying the required power for low-voltage devices inside the HEV.

Another object of the present disclosure is to provide a HEV power system having a battery power integration apparatus to solve the above-mentioned problems. The HEV power system includes a battery power integration apparatus, a high-voltage battery module, and a low-voltage battery. The battery power integration apparatus includes a power converter, a battery control module, and a relay. The power converter has an input side and an output side, and the input side is connected to a high-voltage DC voltage. The battery control module includes a relay control circuit and a pre-charge control circuit. The relay is connected to the input side of the power converter and the battery control module.

The high-voltage battery includes a high-voltage battery and a battery management unit. The high-voltage battery is connected to the input side of the power converter via the relay to provide the high-voltage DC voltage. The battery management unit is connected to the high-voltage battery to manage operations of the high-voltage battery. The low-voltage battery is connected to the output side of the power converter.

The pre-charge control circuit receives a pre-charge enable signal generated from the power converter to pre-charge the input side of the power converter. When the relay control circuit turns on the relay, the power converter steps down the high-voltage DC voltage to output a low-voltage DC voltage at the output side, thus supplying the required power for low-voltage devices inside the HEV and charging the low-voltage battery.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
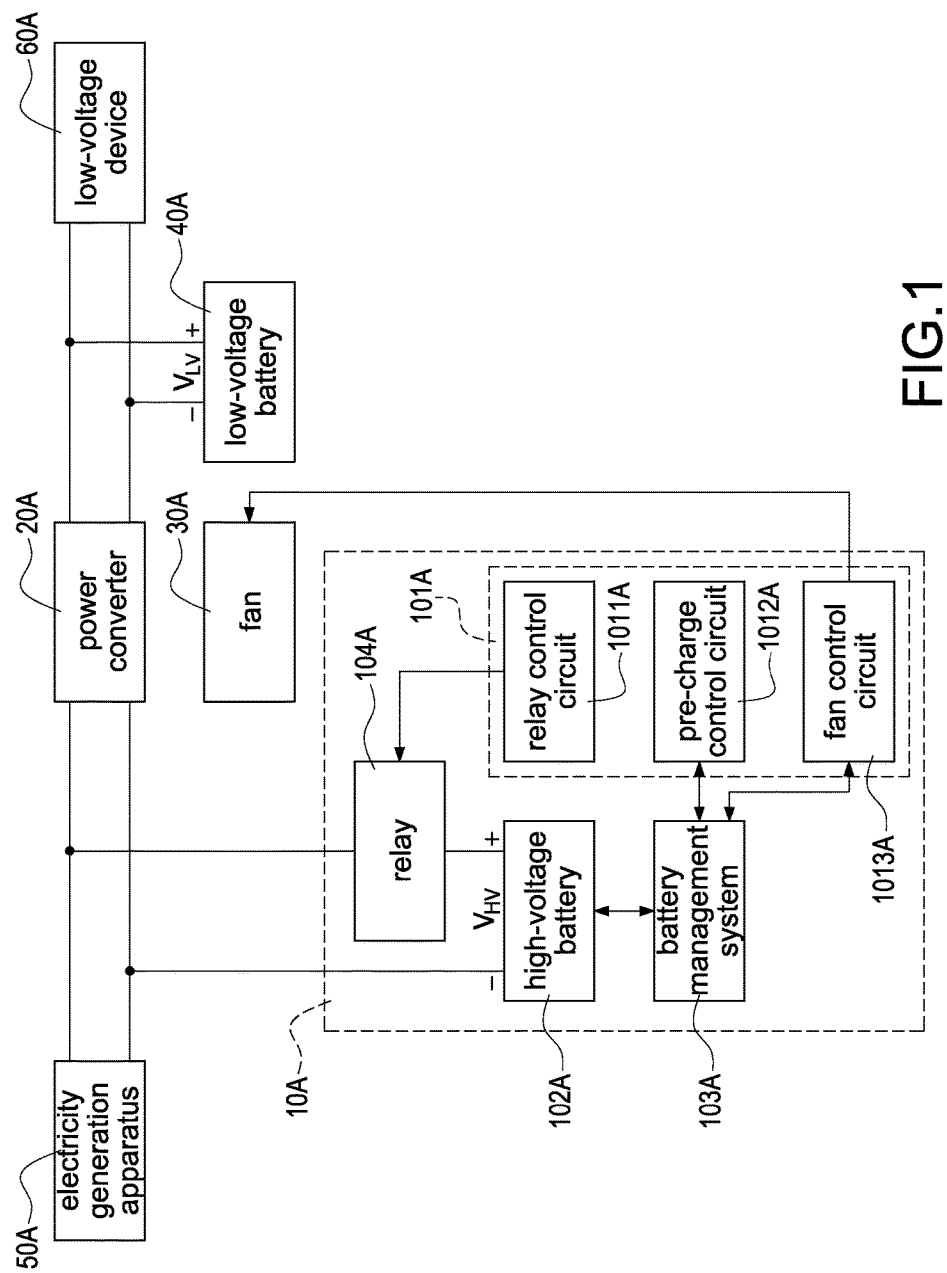
FIG. 1 is a block circuit diagram of a related-art vehicle power conversion system.

Reference will now be made to the drawing figures to describe the present disclosure in detail.

Figure 2:
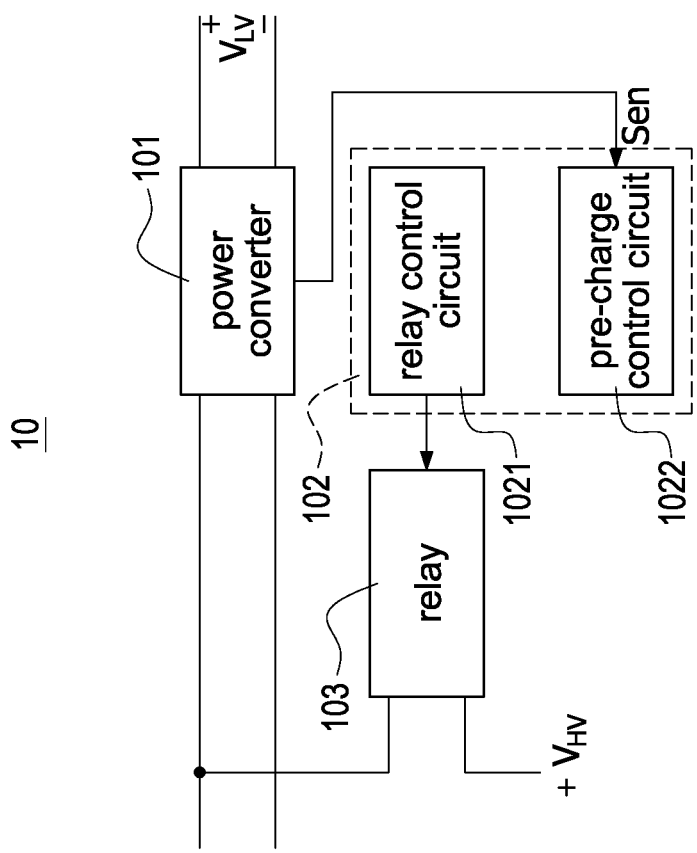
FIG. 2 is a block circuit diagram of a battery power integration apparatus according to the present disclosure.

Reference is made to FIG. 2 which is a block circuit diagram of a battery power integration apparatus according to the present disclosure. The battery power integration apparatus 10 is applied to a hybrid electric vehicle (HEV). The battery power integration apparatus 10 includes a power converter 101, a battery control module 102, and a relay 103. The power converter 101 has an input side and an output side. The input side is connected to a high-voltage DC voltage VHV via the relay 103. In particular, the power converter 101 is a DC-to-DC converter.

The battery control module 102 has a relay control circuit 1021 and a pre-charge control circuit 1022. The relay 103 is connected to the input side of the power converter 101 and the battery control module 102.

The pre-charge control circuit 1022 receives a pre-charge enable signal Sen generated from the power converter 101 to pre-charge the input side of the power converter 101. When the relay control circuit 1021 turns on the relay 103, the power converter 101 steps down the high-voltage DC voltage VHV to output a low-voltage DC voltage VLV at the output side, thus supplying the required power for low-voltage devices inside the HEV.

In other words, the pre-charge control circuit 1022 receives the pre-charge enable signal Sen to pre-charge the input side of the power converter 101 before the relay control circuit 1021 turns on the relay 103. When the pre-charge control circuit 1022 pre-charges the input side of the power converter 101, the voltage at the input side is increased to reduce a voltage difference between the high-voltage battery 201 and the input side of the power converter 101 so as to reduce a current instantly flowing through the input side of the power converter 101, thus protecting contacts of the relay 103 and extending lifetime of the relay 103. The detailed operation of the battery power integration apparatus 10 will be described hereinafter as follows.

Figure 3:
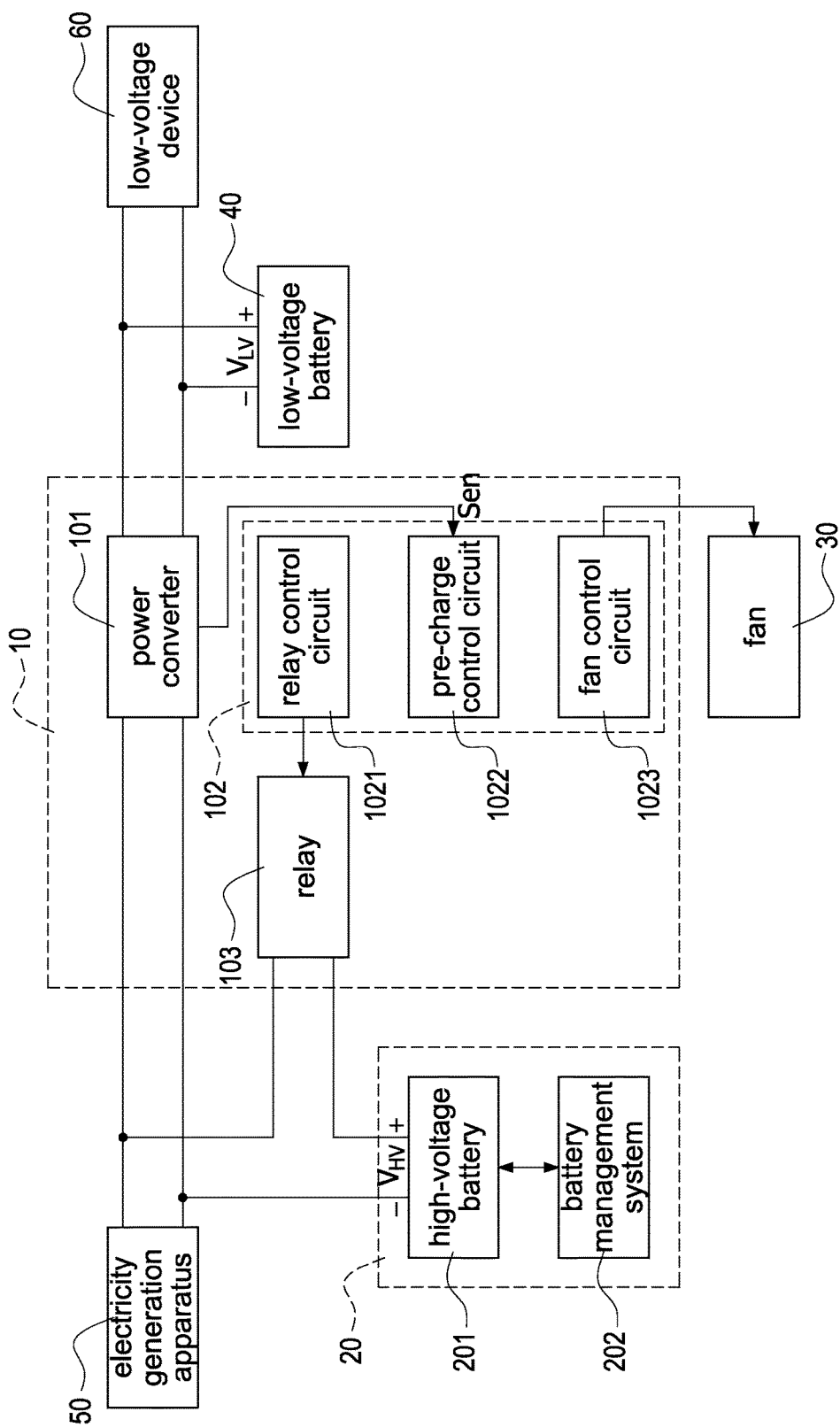
FIG. 3 is a block circuit diagram of a HEV power system having the battery power integration apparatus according to the present disclosure.

Reference is made to FIG. 3 which is a block circuit diagram of a HEV power system having the battery power integration apparatus according to the present disclosure. The HEV power system includes a battery power integration apparatus 10, a high-voltage battery module 20, and a low-voltage battery 40. The battery power integration apparatus 10 has a power converter 101, a battery control module 102, and a relay 103. The power converter 101 has an input side and an output side, and the input side is connected to a high-voltage DC voltage VHV. The battery control module 102 has a relay control circuit 1021 and a pre-charge control circuit 1022. The relay 103 is connected to the input side of the power converter 101 and the battery control module 102.

The high-voltage battery module 20 has a high-voltage battery 201 and a battery management unit 202. The high-voltage battery 201 is connected to the input side of the power converter 101 via the relay 103 to provide the high-voltage DC voltage VHV. The battery management unit 202 is connected to the high-voltage battery 201 to manage operations of the high-voltage battery 201. The low-voltage battery 40 is connected to the output side of the power converter 101.

The pre-charge control circuit 1022 receives a pre-charge enable signal Sen to pre-charge the input side of the power converter 101. After the relay control circuit 1021 turns on the relay 103, the power converter 101 steps down the high-voltage DC voltage VHV to output a low-voltage DC voltage VLV at the output side, thus supplying the required power for low-voltage devices inside the HEV and charging the low-voltage battery 40.

In addition, the battery control module 102 further includes a fan control circuit 1023. The fan control circuit 1023 controls a fan to remove heat from the battery power integration apparatus 10 according to system temperatures sensed by the power converter 101.

Figure 4:
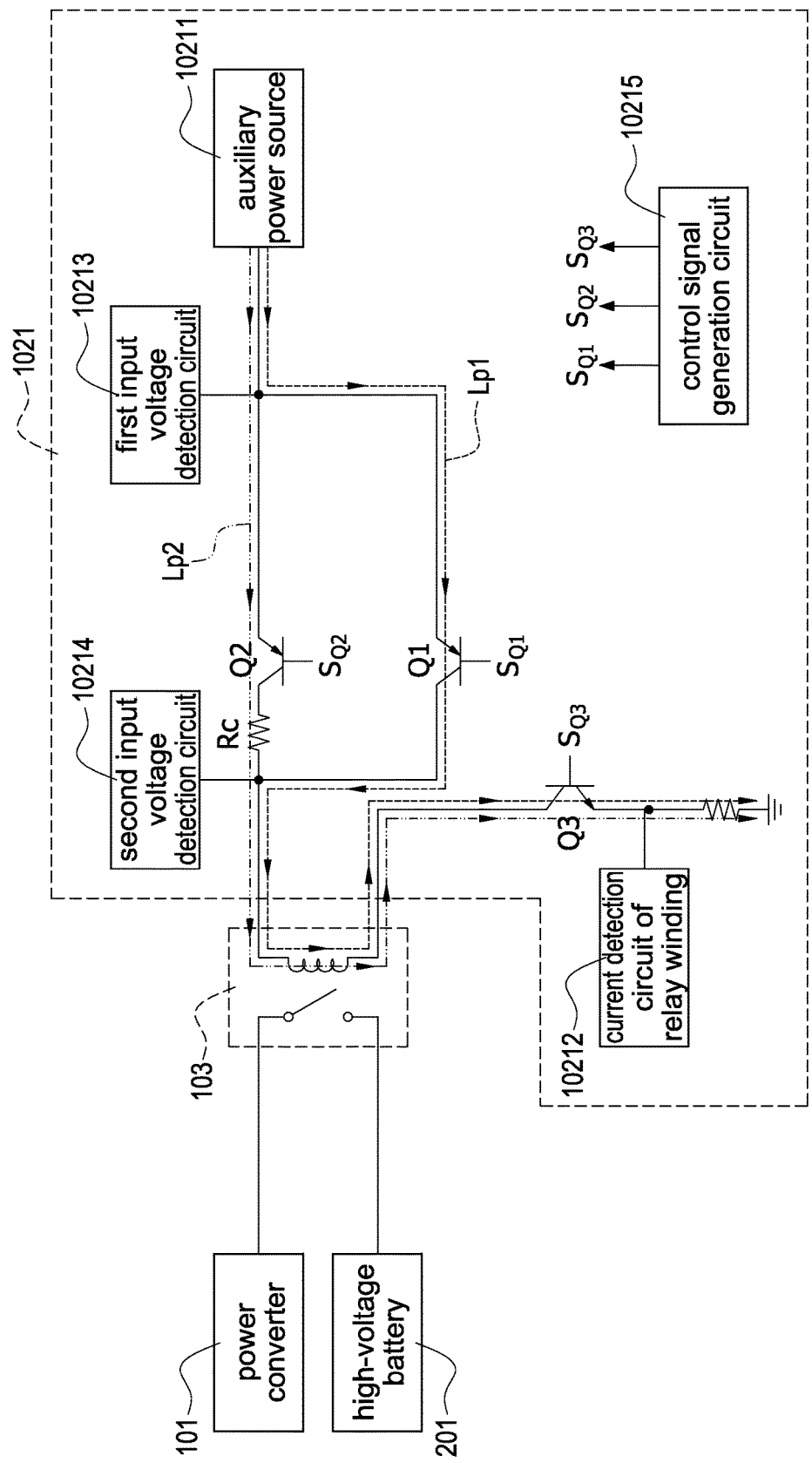
FIG. 4 is a block diagram of a relay control circuit of the battery power integration apparatus according to the present disclosure.

Reference is made to FIG. 4 which is a block diagram of a relay control circuit of the battery power integration apparatus according to the present disclosure. The relay control circuit 1021 includes an auxiliary power source 10211, a current detection circuit of relay winding 10212, a first input voltage detection circuit 10213, a second input voltage detection circuit 10214, a control signal generation circuit 10215, a first switch Q1, a second switch Q2, a third switch Q3, and a current-limiting resistor Rc. In particular, the control signal generation circuit 10215 generates a first switch control signal SQ1, a second switch control signal SQ2, and a third switch control signal SQ3 to correspondingly control the first switch Q1, the second switch Q2, and the third switch Q3. In this example, the first switch Q1 and the second switch Q2 are PNP bipolar junction transistors (BJTs) and the third switch Q3 is a NPN BJT. However, this example is for demonstration and not for limitation of the present invention.

The auxiliary power source 10211, typically 12 volts, is provided from the power converter 101 itself. The second switch Q2 is connected to the current-limiting resistor Rc in series and then the in-series second switch Q2 and the current-limiting resistor Rc are connected to the first switch Q1 in parallel. The connection structure of the first switch Q1, the second switch Q2, and the current-limiting resistor Rc is connected to one terminal of the winding of the relay 103. Further, the third switch Q3 is connected to the other terminal of the winding of the relay 103.

When the relay control circuit 1021 initially operates, the control signal generation circuit 10215 generates the first switch control signal SQ1 to turn on the first switch Q1, generates the second switch control signal SQ2 to turn off the second switch Q2, and generates the third switch control signal SQ3 to turn on the third switch Q3. Accordingly, the auxiliary power source 10211 provides an initial conduction to the relay 103 via a first operation path Lp1 sequentially formed by the first switch Q1, the winding of the relay 103, and the third switch Q3.

Until the relay 103 is fully in conduction, the control signal generation circuit 10215 provides the second switch control signal SQ2 to turn on the second switch Q2 and then provides the first switch control signal SQ1 to turn off the first switch Q1. Accordingly, the auxiliary power source 10211 provides a continuous conduction to the relay 103 via a second operation path Lp2 sequentially formed by the second switch Q2, the current-limiting resistor Rc, the winding of the relay 103, and the third switch Q3. In particular, the current-limiting resistor Rc is used to implement power saving function. That is, the operation path for the relay 103 is from the first operation path Lp1 to the second operation path Lp2 with the current-limiting resistor Rc after the relay 103 is fully conduction, thus significantly reducing power consumption.

Especially, the current detection circuit of relay winding 10212 is connected to an emitter of the third switch Q3 for detecting a current flowing through the relay 103. Once the current is excessive, an over-current protection mechanism is started. In particular, the current-limiting resistor Rc is used to limit the current flowing through the second operation path Lp2 to reduce the voltage across the winding of the relay 103, thus achieving functions of self-diagnosis, energy saving, and over-current and over-voltage protections for the relay 103.

In addition, the first input voltage detection circuit 10213 is connected to emitters of the first switch Q1 and the second switch Q2 and the second input voltage detection circuit 10214 is connected to collectors of the first switch Q1 and the second switch Q2 to detect a voltage across the emitter and the collector of the first switch Q1 and a voltage across the emitter and the collector of the second switch Q2. Also, the first input voltage detection circuit 10213 and the second input voltage detection circuit 10214 are coordinated with the battery management unit 202 and the power converter 101 to meet the requirement of ASIL-C functional safety.

Figure 5:
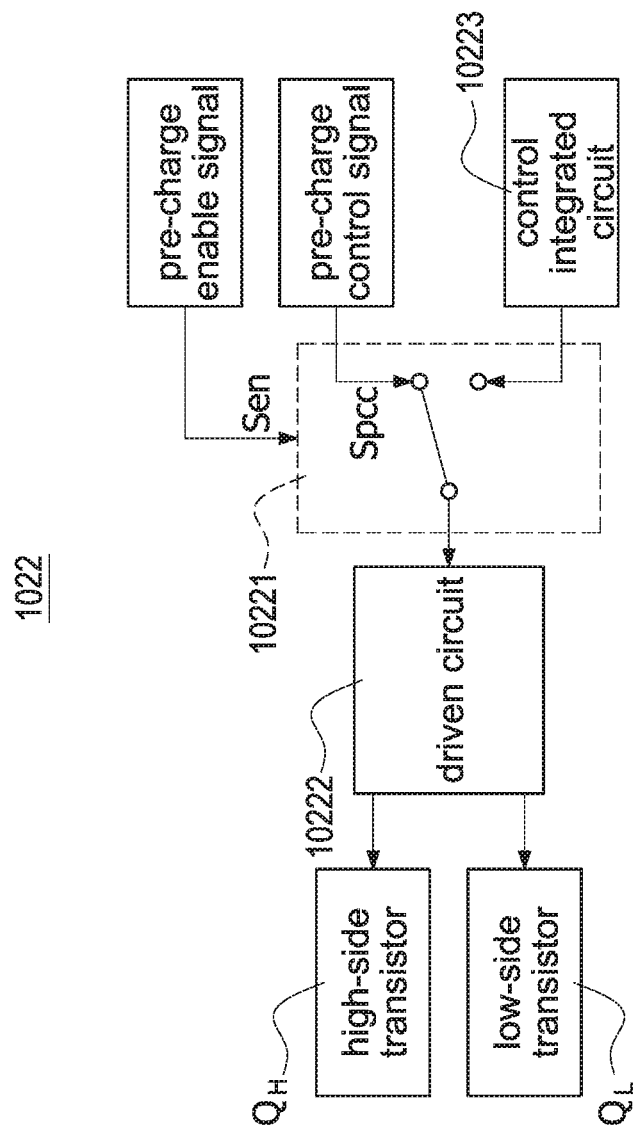
FIG. 5 is a block diagram of a pre-charge control circuit of the battery power integration apparatus according to the present disclosure.

Reference is made to FIG. 5 which is a block diagram of a pre-charge control circuit of the battery power integration apparatus according to the present disclosure. The pre-charge control circuit 1022 includes a switching switch 10221 and a driven circuit 10222. The high-side transistor QH and the low-side transistor QL are two transistor switches of the power converter 101. The switching switch 10221 has two input terminals, a control terminal, and an output terminal. The two input terminals correspondingly receive a pre-charge control signal Spcc and connect to a control integrated circuit 10223. The control terminal receives the pre-charge enable signal Sen generated from a microcontroller in the power converter 101.

The power converter 101 generates the high-level pre-charge enable signal Sen to the control terminal to start the pre-charge operation so that the switching switch 10221 is switched to make the driven circuit 10222 receive the pre-charge control signal Spcc. In particular, the pre-charge control signal Spcc can be generated by a microcontroller (MCU) or an integrated circuit (IC), but not limited. In this embodiment, the 12-volt voltage at the low-voltage side steps up to 48 volts when the pre-charge operation is started. The driven circuit 10222 drives the high-side transistor QH and the low-side transistor QL of the power converter 101 to increase the voltage at the input side of the power converter 101 to reduce a voltage difference between the high-voltage battery 201 and the input side of the power converter 101 so as to reduce a current instantly flowing through the input side of the power converter 101, thus protecting contacts of the relay 103 and extending lifetime of the relay 103.

On the contrary, the power converter 101 generates the low-level pre-charge enable signal Sen to input to the control terminal when the pre-charge operation is completed. Accordingly, the switching switch is switched to make the driven circuit 10222 receive a PWM control signal generated from the control integrated circuit 10223 to provide common controls.

In conclusion, the present disclosure has following advantages:

1. The battery control module 102 and the power converter 101 are integrated, and an auxiliary power source of the power converter 101 is used to supply power so that the battery management unit 202 can focus on managing the high-voltage battery 201 to reduce the number of components, omit the SPI interfaces, simplify the design complexity, and reduce the overall system costs;

2. The power converter 101 integrates the relay control to rapidly control the relay 103 according to the system condition and the relay control circuit 1021 so that the relay 103 can be immediately turned off to execute protection operations to increase the power supply reliability when abnormal conditions of the system occur;

3. When the pre-charge control procedure is executed, the pre-charge control circuit 1022 pre-charges the input side of the power converter 101 to increase the voltage at the input side of the power converter 101 to reduce a voltage difference between the high-voltage battery and the input side of the power converter so as to reduce a current instantly flowing through the input side of the power converter 101. After the pre-charge control procedure is completed, the relay 103 is controlled to electrically connect the high-voltage battery 201 and the power converter 101, thus protecting contacts of the relay 103 and extending lifetime of the relay 103. The high-side transistor $Q_H$ and the low-side transistor $Q_L$ of the power converter 101 are used to implement the pre-charge operation, thus reducing the number of extra components and reducing overall system costs; and 4. The circuit structure can be applied to isolated and non-isolated DC converters, including a converter which can step down the high-voltage DC voltage $V_{HV}$ to output a low-voltage DC voltage $V_{LV}$ at the output side, such as the buck converter.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A battery power integration apparatus applied to a hybrid electric vehicle (HEV), the battery power integration apparatus comprising:
  a power converter having an input side and an output side, and the input side connected to a high-voltage DC voltage;
  a battery control module comprising:
    a relay control circuit; and
    a pre-charge control circuit connected to the input side of the power converter, and the input side having a high-side transistor and a low-side transistor, the pre-charge control circuit comprising:

a switching switch having at least one input terminal, a control terminal, and an output terminal; and
a driven circuit connected to the output terminal of the switching switch;
wherein when the power converter generates a pre-charge enable signal with high level to the control terminal of the switching switch to start a pre-charge operation, the switching switch is switched to make the driven circuit receive a pre-charge control signal, and the driven circuit drives the high-side transistor and the low-side transistor to increase a voltage at the input side of the power converter, thus reducing a voltage difference between a high-voltage battery and the input side of the power converter; and
a relay connected to the input side of the power converter and the battery control module;
wherein when the relay control circuit turns on the relay, and the power converter steps down the high-voltage DC voltage to output a low-voltage DC voltage at the output side, thus supplying the required power for low-voltage devices inside the HEV.

2. The battery power integration apparatus in claim 1, wherein the battery control module further comprises:
a fan control circuit that controls a fan to remove heat from the battery power integration apparatus according to system temperatures sensed by the power converter.

3. The battery power integration apparatus in claim 1, wherein relay control circuit comprises:
a first switch connected to an auxiliary power source generated from the power converter;
a second switch connected to the auxiliary power source;
a current-limiting resistor connected to the second switch in series to form an in-series branch, and the in-series branch connected to the first switch and then connected to one terminal of the relay;
a third switch connected to the other terminal of the relay; and
a control signal generation circuit that generates a first switch control signal, a second switch control signal, and a third switch control signal to correspondingly control the first switch, the second switch, and the third switch;
wherein the relay is initially conductive when the first switch control signal turns on the first switch, the second switch control signal turns off the second switch, and the third switch control signal turns on the third switch; until the relay is fully conductive, when the first switch control signal turns off the first switch, the second switch control signal turns on the second switch, and the third switch control signal turns on the third switch so that the relay is continuously conductive.

4. The battery power integration apparatus in claim 3, wherein the relay control circuit further comprises:
a current detection circuit of relay winding connected to the third switch to detect a current flowing through the relay, and provide an over-current protection when the current is excessive.

5. The battery power integration apparatus in claim 3, wherein relay control circuit further comprises:
a first input voltage detection circuit connected to one terminal of the in-series branch to detect a voltage at the terminal of the in-series branch; and
a second input voltage detection circuit connected to the other terminal of the in-series branch to detect a voltage at the other terminal of the in-series branch;
wherein the detected voltages at the terminals of the in-series branch are coordinated with the battery management unit to meet a requirement of ASIL-C functional safety.

6. A HEV power system having a battery power integration apparatus, comprising:
a battery power integration apparatus, having:
a power converter having an input side and an output side, and the input side connected to a high-voltage DC voltage;
a battery control module comprising:
a relay control circuit; and
a pre-charge control circuit connected to the input side of the power converter, and the input side having a high-side transistor and a low-side transistor, the pre-charge control circuit comprising:
a switching switch having at least one input terminal, a control terminal, and an output terminal; and
a driven circuit connected to the output terminal of the switching switch,
wherein when the power converter generates a pre-charge enable signal with high level to the control terminal of the switching switch to start a pre-charge operation, the switching switch is switched to make the driven circuit receive a pre-charge control signal; the driven circuit drives the high-side transistor and the low-side transistor to increase a voltage at the input side of the power converter, thus reducing a voltage difference between a high-voltage battery and the input side of the power converter; and
a relay connected to the input side of the power converter and the battery control module;
a high-voltage battery module, comprising:
a high-voltage battery connected to the input side of the power converter via the relay to provide the high-voltage DC voltage; and
a battery management unit connected to the high-voltage battery to manage operations of the high-voltage battery; and
a low-voltage battery connected to the output side of the power converter;
wherein when the relay control circuit turns on the relay, the power converter steps down the high-voltage DC voltage to output a low-voltage DC voltage at the output side, thus supplying the required power for low-voltage devices inside the HEV and charging the low-voltage battery.

7. The HEV power system in claim 6, further comprising:
an electricity generation apparatus connected to the input side of the power converter to generate an input DC power source; wherein the power converter converts the input DC power source into an output DC power source at the output side.

8. The HEV power system in claim 6, wherein the battery control module further comprises:
a fan control circuit that controls a fan to remove heat from the battery power integration apparatus according to system temperatures sensed by the battery management unit or the power converter.

9. The HEV power system in claim 6, wherein relay control circuit comprises:
a first switch connected to an auxiliary power source generated from the power converter;
a second switch connected to the auxiliary power source;

a current-limiting resistor connected to the second switch in series to form an in-series branch, and the in-series branch connected to the first switch and then connected to one terminal of the relay;

a third switch connected to the other terminal of the relay; and a control signal generation circuit that generates a first switch control signal, a second switch control signal, and a third switch control signal to correspondingly control the first switch, the second switch, and the third switch;

wherein the relay is initially conductive when the first switch control signal turns on the first switch, the second switch control signal turns off the second switch, and the third switch control signal turns on the third switch; until the relay is fully conductive, when the first switch control signal turns off the first switch, the second switch control signal turns on the second switch, and the third switch control signal turns on the third switch so that the relay is continuously conductive.

10. The HEV power system in in claim 9, wherein the relay control circuit further comprises:

a current detection circuit of relay winding connected to the third switch to detect a current flowing through the relay, and provide an over-current protection when the current is excessive.

11. The HEV power system in in claim 9, wherein relay control circuit further comprises:

a first input voltage detection circuit connected to one terminal of the in-series branch to detect a voltage at the terminal of the in-series branch; and a second input voltage detection circuit connected to the other terminal of the in-series branch to detect a voltage at the other terminal of the in-series branch;

wherein the detected voltages at the terminals of the in-series branch are coordinated with the battery management unit to meet a requirement of ASIL-C functional safety.

* * * * *